United States Patent
Okunaka et al.

(10) Patent No.: US 8,383,726 B2
(45) Date of Patent: Feb. 26, 2013

(54) IMPACT RESISTANCE IMPROVER, THERMOPLASTIC RESIN COMPOSITION, SHAPED ARTICLE AND METHOD FOR PRODUCING GRAFT COPOLYMER

(75) Inventors: Osamu Okunaka, Toyohashi (JP); Hiroyuki Nishii, Ootake (JP); Takashi Shouji, Ootake (JP); Keiji Nakamura, Ootake (JP); Tae Uk Kim, Suwon-si (KR); Byung Choon Lee, Anyang-Si (KR)

(73) Assignees: Mitsubishi Rayon Co., Ltd., Tokyo (JP); Cheil Industries Inc., Gumi-si (KR)

( * ) Notice: Subject to any disclaimer, the term of this patent is extended or adjusted under 35 U.S.C. 154(b) by 337 days.

(21) Appl. No.: 12/439,089

(22) PCT Filed: Aug. 29, 2007

(86) PCT No.: PCT/JP2007/066734
§ 371 (c)(1), (2), (4) Date: May 4, 2009

(87) PCT Pub. No.: WO2008/026626
PCT Pub. Date: Mar. 6, 2008

(65) Prior Publication Data
US 2009/0209707 A1     Aug. 20, 2009

(30) Foreign Application Priority Data
Aug. 29, 2006 (JP) .................................. 2006-231776

(51) Int. Cl.
C08F 257/02 (2006.01)
C08F 279/02 (2006.01)
C08L 51/04 (2006.01)
C08L 55/02 (2006.01)

(52) U.S. Cl. ................ 525/64; 525/55; 525/63; 525/67; 525/68; 525/902

(58) Field of Classification Search .................... 525/50, 525/55, 63, 64, 67, 242, 310, 902, 68
See application file for complete search history.

(56) References Cited

U.S. PATENT DOCUMENTS

| | | | |
|---|---|---|---|
| 3,670,052 A | 6/1972 | Saito et al. | |
| 3,981,944 A | 9/1976 | Okamoto et al. | |
| 4,352,910 A * | 10/1982 | Katto et al. | 525/183 |
| 4,431,772 A * | 2/1984 | Katto et al. | 525/80 |
| 4,767,833 A | 8/1988 | Yumoto et al. | |
| 5,191,018 A | 3/1993 | Hagiwara et al. | |
| 6,130,290 A | 10/2000 | Troy et al. | |
| 2005/0107540 A1 | 5/2005 | Yoo et al. | |
| 2005/0239962 A1 | 10/2005 | Yoo et al. | |

FOREIGN PATENT DOCUMENTS

| | | |
|---|---|---|
| EP | 0 390 081 A2 | 10/1990 |
| EP | 1 312 641 A1 | 5/2003 |
| GB | 1 301 166 | 12/1972 |
| GB | 1 474 092 | 5/1977 |
| JP | 62 240352 | 10/1987 |
| JP | 8 143741 | 6/1996 |
| JP | 2003 335935 | 11/2003 |
| JP | 2004 182820 | 7/2004 |
| JP | 2004 536935 | 12/2004 |
| KR | 10-0519382 B1 | 10/2005 |

OTHER PUBLICATIONS

JP 2003-335935 machine translation.*
Office Action issued Aug. 20, 2012 in Korean Patent Application No. 10-2009-7005000.

* cited by examiner

Primary Examiner — Irina S Zemel
Assistant Examiner — Jeffrey Lenihan
(74) Attorney, Agent, or Firm — Oblon, Spivak, McClelland, Maier & Neustadt, L.L.P.

(57) ABSTRACT

Disclosed is a thermoplastic resin composition having excellent impact resistance at a low temperature, while maintaining high transparency; this thermoplastic resin composition is obtained by compounding an impact resistance improver into a thermoplastic resin, the impact resistance improver being composed of a graft copolymer which is obtained by polymerizing a vinyl monomer component in the presence of a polymer mixture containing a polymer having butadiene units as an essential component and a polymer having styrene units as an essential component, the polymer mixture containing 45 to 65% by mass of the butadiene units and 35 to 55% by mass of the styrene units.

18 Claims, No Drawings

US 8,383,726 B2

IMPACT RESISTANCE IMPROVER, THERMOPLASTIC RESIN COMPOSITION, SHAPED ARTICLE AND METHOD FOR PRODUCING GRAFT COPOLYMER

TECHNICAL FIELD

The present invention relates to an impact resistance improver that can improve impact resistance at a low temperature and can maintain high transparency of a thermoplastic resin, in particular, of an aromatic polycarbonate, a thermoplastic resin composition compounded with the impact resistance improver, and a shaped article of the thermoplastic resin composition.

The present application claims the priority of Japanese Patent Application No. 2006-231776 filed on Aug. 29, 2006, the contents of which are hereby incorporated herein by reference.

BACKGROUND ART

Aromatic polycarbonates are thermoplastic resins having excellent impact resistance at a room temperature and excellent transparency, and hence they are used in fields, where transparency is needed, such as materials for use in light media, OA equipment, automobile materials, and sundries. However, it is pointed out as a problem that the impact resistance at a low temperature is low. In addition, when a general-purpose impact resistance improver is compounded in an aromatic polycarbonate, it is also pointed out as a problem that transparency of shaped articles of the aromatic polycarbonate is deteriorated because refractive index of the aromatic polycarbonate is high and the difference in refractive indexes between the aromatic polycarbonate and the impact resistance improver becomes large.

As a method for improving impact resistance of the aromatic polycarbonate at a low temperature, there has been proposed a method for compounding, as an impact resistance improver, a grafted copolymer in which styrene and acrylonitrile are polymerized onto a butadiene-based rubber (Patent Document 1). However, the aromatic polycarbonate compositions to be obtained by this method have a problem that transparency of the shaped articles thereof is lowered though impact resistance thereof at a low temperature is improved.
Patent Document 1: Japanese Patent Application Laid-Open No. Sho 62-240352

DISCLOSURE OF THE INVENTION

Problem to be Solved by the Invention

It is an object of the present invention to provide an impact resistance improver that can improve impact resistance at a low temperature and can maintain high transparency of a thermoplastic resin, in particular, of an aromatic polycarbonate. It is another object of the present invention to provide a thermoplastic resin composition compounded with the impact resistance improver. It is another object of the present invention to provide a shaped article of the thermoplastic resin composition.

Means to Solve the Problem

The present inventors have diligently studied and found that impact resistance at a low temperature of an aromatic polycarbonate can be improved and high transparency thereof can be maintained by using, as an impact resistance improver, a graft copolymer to be obtained by polymerizing a vinyl monomer component (b) in the presence of a polymer mixture (A) comprising a polymer (A1) having butadiene units as a major component and a polymer (A2) having styrene units as a major component.

Namely, the present invention is an impact resistance improver which is a graft copolymer to be obtained by polymerizing a vinyl monomer component (b) in the presence of a polymer mixture (A) comprising a polymer (A1) having butadiene units as a major component and a polymer (A2) having styrene units as a major component, wherein a content of the butadiene units is 45 to 65% by mass and a content of the styrene units is 35 to 55% by mass, in the polymer mixture (A).

The impact resistance improver preferably has a content of 40 to 80% by mass of an aromatic vinyl monomer (b1) and a content of 20 to 60% by mass of an alkyl(meth)acrylate monomer (b2), in 100% by mass of the vinyl monomer component (b).

The impact resistance improver preferably has a content of 60 to 85% by mass of the polymer mixture (A) and a content of 15 to 40% by mass of a grafted portion to be obtained by polymerizing the vinyl monomer component (b), in 100% by mass of the graft copolymer.

In addition, the present invention is a thermoplastic resin composition comprising 90 to 99% by mass of a thermoplastic resin and 1 to 10% by mass of the impact resistance improver, and a shaped article to be obtained by shaping the thermoplastic resin composition.

The thermoplastic resin composition is preferably the one in which the thermoplastic resin is an aromatic polycarbonate.

In addition, the present invention is a method for producing a graft copolymer, comprising: mixing a latex of a polymer (A1) having butadiene units as a major component and a monomer component having styrene as a major component; producing a polymer mixture (A) in which a content of the butadiene units is 45 to 65% by mass and a content of the styrene units is 35 to 55% by mass by starting polymerization of the monomer component having styrene as a major component; and polymerizing a vinyl monomer component (b) in the presence of the polymer mixture (A).

In addition, the present invention is a method for producing a graft copolymer, comprising: producing a polymer mixture (A) in which a content of the butadiene units is 45 to 65% by mass and a content of the styrene units is 35 to 55% by mass by polymerizing the monomer component having butadiene as a major component in the presence of a latex of a polymer (A2) having styrene units as a major component; and polymerizing a vinyl monomer component (b) in the presence of the polymer mixture (A).

In the method for producing the graft copolymer, it is preferable that a content of the aromatic vinyl monomer (b1) be 40 to 80% by mass and a content of the alkyl(meth)acrylate monomer (b2) be 20 to 60% by mass, in 100% by mass of the vinyl monomer component (b).

In the method for producing the graft copolymer, it is preferable that a content of the polymer mixture (A) be 60 to 85% by mass and a content of a grafted portion to be obtained by polymerizing the vinyl monomer component (b) be 15 to 40% by mass, in 100% by mass of the graft copolymer.

Effect of the Invention

According to the impact resistance improver of the present invention, impact resistance at a low temperature of a thermoplastic resin, in particular, of an aromatic polycarbonate can be improved and shaped articles thereof maintaining high transparency can be obtained.

BEST MODE FOR CARRYING OUT THE INVENTION

In the present description, (meth)acrylic means acrylic or methacrylic, and (meth)acrylate means acrylate or methacrylate.

The polymer mixture (A) of the present invention comprises the polymer (A1) having butadiene units as an essential component and the polymer (A2) having styrene units as a major component.

The polymer (A1) having butadiene units as a major component is preferably a homopolymer or copolymer of 1,3-butadiene, and can be obtained by polymerizing 1,3-butadiene, another vinyl monomer if necessary, and a crosslinkable monomer if necessary.

As the other vinyl monomer, for example, aromatic vinyl monomers such as styrene and α-methyl styrene; alkyl(meth) acrylate monomers such as methyl(meth)acrylate, ethyl (meth)acrylate, and n-butyl(meth)acrylate; vinyl cyanide monomers such as (meth)acrylonitrile; alkyl vinyl ether monomers such as methyl vinyl ether and butyl vinyl ether; vinyl halide monomers such as vinyl chloride and vinyl bromide; vinylidene halide monomers such as vinylidene chloride and vinylidene bromide; and glycidyl group-containing vinyl monomers such as glycidyl(meth)acrylate and allyl glycidyl ether are included.

The other vinyl monomer may be used alone or in a combination of two or more kinds.

As the crosslinkable monomer, for example, aromatic multifunctional vinyl monomers such as divinylbenzene and divinyltoluene; di- or tri(meth)acrylate monomers from polyols such as ethyleneglycol di(meth)acrylate and 1,3-butanediol di(meth)acrylate; allyl(meth)acrylate monomers; or di- or triallyl monomers such as diallyl phthalate and triallyl triazine are included.

The crosslinkable monomer may be used alone or in a combination of two or more kinds.

The quantity of 1,3-butadiene in 100% by mass of the monomers to be used for polymerization of the polymer (A1) is preferably 60% by mass or more and more preferably 80% by mass or more from the viewpoint of improvement in impact resistance of a shaped article thus obtained.

The quantity of the other vinyl monomer is preferably 0 to 30% by mass, and the quantity of the crosslinkable monomer is preferably 0 to 10% by mass.

The polymer (A2) having styrene units as a major component is preferably a homopolymer or copolymer of styrene, and can be obtained by polymerizing styrene, another vinyl monomer if necessary, and a crosslinkable monomer if necessary.

As the other vinyl monomer, for example, aromatic vinyl monomers such as α-methyl styrene; alkyl(meth)acrylate monomers such as methyl(meth)acrylate, ethyl(meth)acrylate, and n-butyl(meth)acrylate; vinyl cyanide monomers such as (meth)acrylonitrile; alkyl vinyl ether monomers such as methyl vinyl ether and butyl vinyl ether; vinyl halide monomers such as vinyl chloride and vinyl bromide; vinylidene halide monomers such as vinylidene chloride and vinylidene bromide; glycidyl group-containing vinyl monomers such as glycidyl(meth)acrylate and allyl glycidyl ether; and 1,3-butadiene are included.

The other vinyl monomer may be used alone or in a combination of two or more kinds.

As the crosslinkable monomer, the crosslinkable monomer used in the production of the polymer (A1) can be used.

The quantity of styrene in 100% by mass of the monomers to be used for polymerization of the polymer (A2) is preferably 80% by mass or more and more preferably 90% by mass or more from the viewpoint of maintaining transparency of a shaped article thus obtained.

The quantity of the other vinyl monomer is preferably 0 to 20% by mass, and the quantity of the crosslinkable monomer is preferably 0 to 10% by mass.

The polymer mixture (A) may be a mere mixture of the polymer (A1) and the polymer (A2) or may be a polymer composite in which the polymer (A1) and the polymer (A2) are composed into a composite. It is more preferable that the polymer mixture (A) have a structure in which a domain of the polymer (A2) be formed in the polymer (A1).

When the polymer mixture (A) has a structure in which a domain of the polymer (A2) is formed in the polymer (A1), it is possible that the content of styrene in the polymer mixture (A) is raised while impact resistance at a low temperature is maintained, and thereby refractive index of the whole polymer mixture (A) can be raised. By using such a graft copolymer as an impact resistance improver for a matrix resin having high refractive index such as aromatic polycarbonates, it is possible to improve impact resistance at a low temperature and to maintain high transparency of the shaped article thus obtained.

The content of butadiene units in 100% by mass of the polymer mixture (A) is 45 to 65% by mass and preferably 55 to 65% by mass. The content of styrene units in 100% by mass of the polymer mixture (A) is 35 to 55% by mass and preferably 35 to 45% by mass.

When the content of butadiene units in 100% by mass of the polymer mixture (A) is 45% by mass or more, an improvement effect of impact resistance becomes sufficient, and when the content is 65% by mass or less, transparency of a shaped article thus obtained is maintained. When the content of styrene units in 100% by mass of the polymer mixture (A) is 35% by mass or more, transparency of the shaped article thus obtained is maintained, and when the content is 55% by mass or less, the improvement effect of impact resistance becomes sufficient.

The contents of the polymer (A1) and the polymer (A2) in 100% by mass of the polymer mixture (A) are calculated using numerical values represented by the following (X) to (Z).

(X): The contents of 1,3-butadiene and styrene in 100% by mass of the monomers to be used for polymerization of the polymer (A1).

(Y): The contents of styrene and 1,3-butadiene in 100% by mass of the monomers to be used for polymerization of the polymer (A2).

(Z): The contents of butadiene units (45 to 65% by mass) and styrene units (35 to 55% by mass) in 100% by mass of the polymer mixture (A).

As a method for producing the polymer mixture (A), emulsion polymerization is suitable, and for example, methods of the following (1) and (2) can be mentioned.

(1): A method for mixing a latex of the polymer (A1) having butadiene units as a major component and a monomer component having styrene as a major component, impregnating the polymer (A1) with the monomer component having styrene as a major component, and starting polymerization of the monomer component having styrene as a major component.

(2): A method for polymerizing a monomer component having butadiene as a major component in the presence of a latex of the polymer (A2) having styrene units as an a major.

As the method for producing the polymer mixture (A), the method of (1) mentioned above is preferable because a domain size of the polymer (A2) having styrene units as a major component becomes smaller than a particle diameter of the polymer (A1) having butadiene units as a major component and thereby it is highly probable that the domain can be formed sufficiently smaller compared with the wavelength of visible light.

The graft copolymer of the present invention can be obtained by polymerizing the vinyl monomer component (b) in the presence of the polymer mixture (A). The purpose of polymerizing the vinyl monomer component (b) in the presence of the polymer mixture (A) is grafting the polymer mixture (A) with the vinyl monomer component (b), however, there are by-produced free polymers obtained by polymerization of the vinyl monomer component (b) alone which is not grafted to the polymer mixture (A), and a mixture of the graft copolymer and the free polymers is accordingly obtained.

In the present invention, the term "the graft copolymer" includes free polymers thus by-produced. In addition, the term "the grafted portion" includes the free polymers in the case of the polymer obtained by polymerizing the vinyl monomer component (b).

The vinyl monomer component (b) of the present invention contains one or more vinyl monomers. As the vinyl monomer, for example, aromatic vinyl monomers such as styrene, α-methyl styrene, and vinyltoluene; alkyl(meth)acrylate monomers such as methyl(meth)acrylate, ethyl(meth)acrylate, n-butyl(meth)acrylate, and 2-ethylhexyl(meth)acrylate; and vinyl cyanide monomers such as (meth)acrylonitrile are included.

In addition, the vinyl monomer component (b) can contain a crosslinkable monomer if necessary. As the crosslinkable monomer, for example, aromatic multifunctional vinyl monomers such as divinylbenzene; di- and tri(meth)acrylate monomers of polyol such as ethylene glycol di(meth)acrylate and propylene glycol di(meth)acrylate; multifunctional (meth)acrylic group-modified silicone monomers; an allyl (meth)acrylate monomer; and di- and triallyl monomers such as diallyl phthalate and triallyl cyanurate are included.

The crosslinkable monomer may be used alone or in a combination of two or more kinds.

It is preferable that the vinyl monomer component (b) contain the aromatic vinyl monomer (b1) and the alkyl(meth)acrylate monomer (b2), and it is more preferable that the content of the aromatic vinyl monomer (b1) be 40 to 80% by mass and a content of the alkyl(meth)acrylate monomer (b2) be 20 to 60% by mass, in 100% by mass of the vinyl monomer component (b).

When the content of the aromatic vinyl monomer (b1) in 100% by mass of the vinyl monomer component (b) is 40% by mass or more, transparency of a shaped article thus obtained is maintained because refractive index of the grafted portion becomes high, and when the content is 80% by mass or less, an improvement effect of impact resistance becomes sufficient and transparency of the shaped article thus obtained is maintained because compatibility with a thermoplastic resin becomes high.

When the content of the alkyl(meth)acrylate monomer (b2) in 100% by mass of the vinyl monomer component (b) is 20% by mass or more, the improvement effect of impact resistance becomes sufficient and transparency of the shaped article thus obtained is maintained, and when the content is 60% by mass or less, transparency of the shaped article thus obtained is maintained.

In addition, 100% by mass of the vinyl monomer component (b) may contain 40 to 80% by mass of the aromatic vinyl monomer (b1), 20 to 60% by mass of the alkyl(meth)acrylate monomer (b2), and 0 to 20% by mass of another vinyl monomer (b3).

When the content of the other vinyl monomer (b3) in 100% by mass of the vinyl monomer component (b) is 20% by mass or less, the improvement effect of impact resistance becomes sufficient and transparency of the shaped article thus obtained is maintained.

The content of the polymer mixture (A) in 100% by mass of the graft copolymer is preferably 60 to 85% by mass and more preferably 70 to 80% by mass. The content of the grafted portion to be obtained by polymerizing the vinyl monomer component (b) in 100% by mass of the graft copolymer is preferably 15 to 40% by mass and more preferably 20 to 30% by mass.

When the content of the polymer mixture (A) in 100% by mass of the graft copolymer is 60% by mass or more, an improvement effect of impact resistance becomes sufficient, and when the content is 85% by mass or less, handleability as the graft copolymer is not lowered and dispersibility in the matrix resin is not lowered. When the content of the grafted portion in 100% by mass of the graft copolymer is 15% by mass or more, handleability as the graft copolymer is not lowered and dispersibility in the matrix resin is not lowered, and when the content is 40% by mass or less, the improvement effect of impact resistance becomes sufficient.

As a method for polymerizing the vinyl monomer component (b) in the presence of the polymer mixture (A), for example, a method of graft polymerization of the vinyl monomer component (b) in one step or multisteps in the presence of a latex of the polymer mixture (A) can be mentioned. It is preferable to carry out graft polymerization of the vinyl monomer component (b) in three steps from the viewpoint of an improvement effect of impact resistance and maintaining transparency of a shaped article thus obtained.

When the graft polymerization of the vinyl monomer component (b) is carried out in three steps, it is preferable that the graft polymerization be carried out with the following method.

The first step: The alkyl(meth)acrylate monomer (b2) or a monomer mixture containing the alkyl(meth)acrylate monomer (b2) and the other vinyl monomer (b3) is used.

The second step: The aromatic vinyl monomer (b1) or a monomer mixture containing the aromatic vinyl monomer (b1) and the other vinyl monomer (b3) is used.

The third step: The alkyl(meth)acrylate monomer (b2) or a monomer mixture containing the alkyl(meth)acrylate monomer (b2) and the other vinyl monomer (b3) is used.

If such a polymerization method is adopted, impact resistance and compatibility with a thermoplastic resin can be improved with the graft polymerization in the first step, refractive index of the grafted portion can be raised with the graft polymerization in the second step, and appearance of a shaped article thus obtained can be improved with the graft polymerization in the third step.

In addition, when such a polymerization method is adopted, it is preferable to use 10 to 50% by mass of the monomer or monomer mixture for the graft polymerization in the first step, 40 to 80% by mass of the monomer or monomer mixture for the graft polymerization in the second step, and 5 to 30% by mass of the monomer or monomer mixture for the graft polymerization in the third step, with the proviso that the sum of the monomers to be used is 100% by mass.

When the quantity of the monomer or monomer mixture to be used for the graft polymerization in the first step is 10% by mass or more, an improvement effect of impact resistance becomes sufficient, and when the quantity is 50% by mass or less, appearance of a shaped article thus obtained is not lowered.

When the quantity of the monomer or monomer mixture to be used for the graft polymerization in the second step is 40% by mass or more, transparency of the shaped article thus obtained can be maintained, and when the quantity is 80% by mass or less, the improvement effect of impact resistance becomes sufficient.

When the quantity of the monomer or monomer mixture to be used for the graft polymerization in the third step is 5% by mass or more, appearance of the shaped article thus obtained is not lowered, and when the quantity is 30% by mass or less, dispersibility of the graft copolymer in the matrix resin is not lowered.

Mass average particle diameter of the graft copolymer is preferably 0.05 µm or more and more preferably 0.08 µm or more. In addition, mass average particle diameter of the graft copolymer is preferably 0.3 µm or less, more preferably 0.2 µm or less, and furthermore preferably 0.15 µm or less.

When the mass average particle diameter of the graft copolymer is 0.05 µm or more, an improvement effect of impact resistance becomes sufficient and dispersibility in the matrix resin is not lowered. When the mass average particle diameter of the graft copolymer is 0.3 µm or less, transparency of a shaped article thus obtained can be maintained, and in particular, haze of the shaped article thus obtained is not raised.

A latex thus obtained of the graft copolymer can be changed into powder by introducing it into a hot water in which an acid such as sulfuric acid or hydrochloric acid; or an alkaline earth metal salt such as calcium chloride, calcium acetate, or magnesium sulfate is dissolved to cause it to coagulate, separating it, and drying it. In a step of causing the latex of the graft copolymer to coagulate, an alkaline metal salt such as sodium carbonate or sodium sulfate may be used together. In addition, it is also possible to directly obtain powder from the latex by a direct drying method such as spray drying method.

The impact resistance improver of the present invention is constituted from the graft copolymer of the present invention. The graft copolymer of the present invention comprises the polymer (A1) having butadiene units as a major component and the polymer (A2) having styrene units as a major component, as the polymer mixture (A).

A butadiene polymer shows a high refractive index (1.52) among rubber polymers that have a glass transition temperature not higher than room temperature, and is advantageous to produce an impact resistance improver having a high refractive index. A styrene polymer is advantageous to raise a refractive index of the impact resistance improver because it shows a high refractive index (1.59).

The impact resistance improver of the present invention can have excellent compatibility with the matrix resin such as an aromatic polycarbonate having a polar group and also can have excellent handleability as an impact resistance improver by using methyl methacrylate at a grafted portion.

In addition, the impact resistance improver can have an excellent improvement effect of impact resistance and excellent handleability as an impact resistance improver by jointly using a component having a low glass transition temperature such as a butadiene polymer, and a component having a high glass transition temperature such as a styrene polymer and a methyl methacrylate polymer.

The thermoplastic resin in which the impact resistance improver of the present invention is compounded is not particularly limited, however, the one having the refractive index of 1.54 to 1.61 is preferable, and an aromatic polycarbonate (refractive index thereof being 1.58 to 1.59) is particularly preferable.

When the refractive index of the thermoplastic resin is less than 1.54, an improvement effect of impact resistance and maintenance of transparency of a shaped article thus obtained can be achieved even if the impact resistance improver of the present invention is not used. When the refractive index of the thermoplastic resin exceeds 1.61, it becomes difficult to maintain transparency of the shaped article thus obtained even if the impact resistance improver of the present invention is used.

The aromatic polycarbonate to be used in the present invention is a publicly known aromatic polycarbonate derived from a divalent phenol. The viscosity average molecular mass thereof is preferably 10,000 to 60,000 and more preferably 15,000 to 30,000.

The aromatic polycarbonate is produced by a publicly known method and, for example, it can be obtained by reacting a divalent phenol and a carbonate precursor through a solution method or a fusion method. As the divalent phenol, 2,2-bis(4-hydroxyphenyl)propane(bisphenol A) is preferable, but, it may be replaced with another divalent phenol if necessary. As the other divalent phenol, for example, bis(4-hydroxyphenyl)methane, 2,2-bis(4-hydroxy-3,5-dimethylphenyl)propane, bis(4-hydroxy-3,5-dimethylphenyl)methane, and bis(4-hydroxyphenyl)sulfone can be mentioned. As the carbonate precursor, for example, phosgene, diphenyl carbonate, and dihaloformates of divalent phenol can be mentioned.

The thermoplastic resin composition of the present invention contains the thermoplastic resin and the impact resistance improver.

The content of the thermoplastic resin in 100% by mass of the thermoplastic resin composition is 90 to 99% by mass, and is preferably 95 to 98% by mass and more preferably 95.5 to 97.5% by mass.

The content of the impact resistance improver in 100% by mass of the thermoplastic resin composition is 1 to 10% by mass, and is preferably 2 to 5% by mass and more preferably 2.5 to 4.5% by mass.

When the content of the thermoplastic resin in 100% by mass of the thermoplastic resin composition is 90% by mass or more, transparency of a shaped article thus obtained is maintained, and when the content is 99% by mass or less, an improvement effect of impact resistance becomes sufficient. When the content of the impact resistance improver in 100% by mass of the thermoplastic resin composition is 1% by mass or more, the improvement effect of impact resistance becomes sufficient, and when the content is 10% by mass or less, transparency of the shaped article thus obtained is maintained.

A flame retardant may be compounded in the thermoplastic resin composition of the present invention as long as it does not deteriorate the purpose of the present invention. As the flame retardant, for example, metal sulfonate flame retardants and sulfonate flame retardants can be mentioned. It is less likely that these flame retardants would decrease transparency of shaped articles thus obtained because their amount of addition are small. Polytetrafluoroethylene having a fibril-forming ability may be compounded to further improve incombustibility. As polytetrafluoroethylene, for example, METABLEN A-3700 (manufactured by Mitsubishi Rayon Co., Ltd.) can be mentioned. METABLEN A-3700 has excellent dispersibility in the thermoplastic resin and hence lowering of transparency of a shaped article thus obtained is small.

A resin such as polyester, polyamide, ABS, or polyphenylene ether; or a reinforcement such as talc, mica, fiberglass, carbon fiber, fibrous titanium oxide, a potassium titanate whisker, or an aluminum borate whisker may be compounded in the thermoplastic resin composition of the present invention as long as it does not deteriorate the purpose of the present invention.

An arbitrary component can be further compounded in the thermoplastic resin composition of the present invention when necessary. As the arbitrary component, for example, antioxidants such as hindered phenol compounds, and phosphite compounds; flowability modifiers such as polycaprolactone; mold release agents; UV absorbers; antistats; and dyes and pigments can be mentioned.

As methods for preparing the thermoplastic resin composition of the present invention, publicly known methods to be used for a preparation of an ordinary resin composition can be mentioned. For example, the impact resistance improver and the thermoplastic resin are introduced into a V-type blender, ribbon mixer or a tumbler, and are mixed uniformly, and then melt-kneaded with a single screw extruder or twin-screw extruder. In addition, it is possible to previously knead a part of the above components and then add and knead the remaining components.

The shaped article of the present invention is obtained by shaping the thermoplastic resin composition of the present invention. As shaping methods, publicly known methods such as an extrusion molding method, an injection molding method, and a compression molding method can be used. In addition, a blow molding method, a vacuum molding method, and the like can also be applied.

The shaped article can be used in a variety of fields that need transparency and coloring properties, such as OA equipment and housings because it has excellent impact resistance and transparency.

EXAMPLES

Hereinafter, the present invention is explained in more detail by examples, however, the present invention is not limited to these examples. In these examples, "part" and "%" mean "part by mass" and "% by mass", respectively.
(Measurement of Rate of Polymerization)

Measurement of a rate of polymerization of a polymer was carried out as follows.

An inhibitor (hydroquinone) was introduced into a latex of a polymer, and heated at 180° C. for 30 minutes, and solid content was measured. A rate of polymerization of the polymer was determined by a comparison with a calculated value from a charged quantity.
(Measurement of Mass Average Particle Diameter)

A mass average particle diameter was measured by the following procedures.

A latex of a polymer was diluted with distilled water to about 3% concentration to obtain a sample, and a mass average particle diameter of the sample was measured using a particle size distribution measuring instrument CHDF2000 manufactured by Matec Instrument Companies, Inc., U.S.A. The measurement was carried out using a standard condition that is recommended as a measuring condition by Matec Instrument Companies, Inc. Namely, using an exclusive capillary cartridge for separation of particles and a carrier liquid, liquid condition being approximately neutral pH, current speed being 1.4 ml/min, pressure being about 4,000 psi (2,600 KPa), and temperature being kept at 35° C., 0.1 ml of the sample was used for measurement.

As standard substances, totally 12 kinds of monodisperse polystyrene, particle sizes of which are known, selected from the particle sizes in the range of from 0.02 to 0.8 µm, manufactured by Duke Scientific Corporation, U.S.A. were used.

Example 1

Graft Copolymer (G-1)

Production of latex of polymer (A1-1):

To a 70L autoclave equipped with a stirrer, a monomer addition port, and a thermometer, the following first monomer mixture was introduced, and temperature inside the autoclave was raised to 43° C. while the mixture was stirred.

The first monomer mixture: 1,3-butadiene (194 parts), styrene (6 parts), t-dodecyl mercaptan (1.0 part), diisopropylbenzene hydroperoxide (1.0 part), sodium dodecylbenzenesulfonate (2.0 parts), sodium hydroxide (0.02 part), and deionized water (585.98 parts).

Subsequently, the following first reducer mixture was added, and polymerization was started.

The first reducer mixture: ferrous sulfate (0.002 part), EDTA-2Na (0.006 part), Rongalite (0.3 part), and deionized water (9.692 parts).

The temperature inside the autoclave was further raised to 65° C. and held for 10 hours, to obtain a latex of a polymer (A1-1). The rate of polymerization of the polymer (A1-1) thus obtained was 95%.
Production of latex of Polymer Mixture (A-1):

To a 5L separable flask equipped with a stirrer, a reflux condenser, a nitrogen introduction pipe, a monomer addition port, and a thermometer, the following latex mixture was introduced at 20° C.

The latex mixture: the latex of the polymer (A1-1) (720 parts) (solid content: 180 parts), styrene (120 parts), t-butyl hydroperoxide (0.4 part), and deionized water (248.4 parts).

The latex mixture was stirred for 1 hour while temperature inside the flask was held at 20° C., and then the temperature inside the flask was raised to 55° C., and the following second reducer mixture was added to the flask to start polymerization of styrene.

The second reducer mixture: Rongalite (0.3 part) and deionized water (9.7 parts).

The temperature inside the flask was raised to 75° C. and held for 90 minutes to obtain a latex of a polymer mixture (A-1).
Production of Graft Copolymer (G-1):

Subsequently, into the whole quantity (1,098.8 parts/solid content: 300 parts) of the latex of the polymer mixture (A-1), the following second monomer mixture was dropped at 75° C. for 15 minutes, and polymerization was carried out.

The second monomer mixture: methyl methacrylate (15 parts), ethyl acrylate (5 parts), and t-butyl hydroperoxide (0.4 part).

The resultant mixture was held at 75° C. for 90 minutes, and the first stage of graft polymerization was finished.

Subsequently, the following third monomer mixture was dropped into the flask at 75° C. for 60 minutes, and polymerization was carried out.

The third monomer mixture: styrene (70 parts) and t-butyl hydroperoxide (0.4 part). The resultant mixture was held at 75° C. for 120 minutes, and the second stage of the graft polymerization was finished.

Subsequently, the following fourth monomer mixture was dropped into the flask at 75° C. for 10 minutes, and polymerization was carried out.

The fourth monomer mixture: methyl methacrylate (10 parts) and t-butyl hydroperoxide (0.4 part).

The resultant mixture was held at 75° C. for 90 minutes, and the third stage of the graft polymerization was finished to obtain a latex of a graft copolymer (G-1). The rate of polymerization of the graft copolymer (G-1) thus obtained was 99% or more, and the mass average particle diameter of the graft copolymer (G-1) was 0.1 μm.

One hundred parts of the latex of the graft copolymer (G-1) thus obtained was subjected to coagulation by introducing it into 200 parts of 5% concentration calcium acetate aqueous solution heated to 80° C. The coagulate was washed with warm water and dried afterwards to obtain powder of the graft copolymer (G-1).

Example 2

Graft Copolymer (G-2)

The same procedure as in Example 1 was carried out except that the latex mixture to be used for production of the latex of the polymer mixture (A-1) was changed to the following mixture to obtain a graft copolymer (G-2).

The latex mixture: the latex of the polymer (A1-1) (600 parts) (solid content: 150 parts), styrene 150 parts, t-butyl hydroperoxide (0.4 part), and deionized water (338.4 parts).

Example 3

Graft Copolymer (G-3)

The same procedure was carried out as in Example 2 except that the second monomer mixture to be used for the first stage of graft polymerization and the third monomer mixture to be used for the second stage of the graft polymerization were changed to the following compositions to obtain a graft copolymer (G-3).

The second monomer mixture: methyl methacrylate (35 parts), ethyl acrylate (5 parts), and t-butyl hydroperoxide (0.4 part).

The third monomer mixture: styrene (50 parts) and t-butyl hydroperoxide (0.4 part).

Example 4

Graft Copolymer (G-4)

Production of Latex of Polymer (A2-4):

To a 5L separable flask equipped with a stirrer, a reflux condenser, a nitrogen introduction pipe, a monomer addition port, and a thermometer, the following first monomer mixture was charged.

The first monomer mixture: styrene (180 parts), diisopropylbenzene hydroperoxide (1.8 parts), sodium dodecylbenzenesulfonate (3 parts), and deionized water (550.2 parts).

The temperature inside the flask was raised to 60° C., and the following first reducer mixture was added to the flask to start polymerization.

The first reducer mixture: ferrous sulfate (0.003 part), EDTA-2Na (0.009 part), Rongalite (0.6 part), and deionized water (14.388 parts).

The resultant mixture was held at 60° C. for 120 minutes, and polymerization was finished to obtain a latex of a polymer (A2-4).

Production of Latex of Polymer Mixture (A-4):

To a 70L autoclave equipped with a stirrer, a monomer addition port, and a thermometer, the following latex mixture was charged and temperature inside the autoclave was raised to 43° C. while the mixture was stirred.

The latex mixture: the latex of the polymer (A2-4) (500 parts) (solid content: 120 parts), butadiene (180 parts), t-dodecyl mercaptan (1.5 parts), diisopropylbenzene hydroperoxide (1.5 parts), sodium hydroxide (0.03 part), and deionized water (400.77 parts).

Subsequently, the following second reducer mixture was added, and polymerization was started.

The second reducer mixture: ferrous sulfate (0.003 part), EDTA-2Na (0.009 part), Rongalite (0.45 part), and deionized water (14.538 parts).

The temperature inside the autoclave was raised to 65° C. and held for 10 hours, to obtain a latex of a polymer mixture (A-4). The rate of polymerization of the polymer mixture (A-4) thus obtained was 98%.

Hereinafter, graft polymerization was carried out in the same manner as in Example 1 except that the latex of the polymer mixture (A-1) was changed to the latex of the polymer mixture (A-4) to obtain a graft copolymer (G-4).

Example 5

Graft Copolymer (G-5)

Production of Latex of Polymer Mixture (A-5):

To a 5L separable flask equipped with a stirrer, a reflux condenser, a nitrogen introduction pipe, a monomer addition port, and a thermometer, the following latex mixture was introduced at 20° C.

The latex mixture: the latex of the polymer (A1-1) (740 parts) (solid content: 185 parts), styrene (115 parts), t-dodecyl mercaptan (0.6 part), t-butyl hydroperoxide (0.4 part), and deionized water (232.8 parts).

The latex mixture was stirred for 1 hour while temperature inside the flask was held at 20° C., and then the temperature inside the flask was raised to 55° C., and the following reducer mixture was added to the flask to start polymerization of styrene.

The reducer mixture: Rongalite (0.3 part) and deionized water (9.7 parts).

The temperature inside the flask was raised to 75° C. and held for 90 minutes to obtain a latex of a polymer mixture (A-5).

Production of Graft Copolymer (G-5):

Subsequently, into the whole quantity (1,098.8 parts/solid content: 300 parts) of the latex of the polymer mixture (A-5), the following first monomer mixture was dropped at 75° C. for 50 minutes, and polymerization was carried out.

The first monomer mixture: methyl methacrylate (35 parts), ethyl acrylate (5 parts), and t-butyl hydroperoxide (0.4 part).

The resultant mixture was held at 75° C. for 90 minutes, and the first stage of graft polymerization was finished.

Subsequently, the following second monomer mixture was dropped into the flask at 75° C. for 60 minutes, and polymerization was carried out.

The second monomer mixture: styrene (50 parts) and t-butyl hydroperoxide (0.4 part)

The resultant mixture was held at 75° C. for 120 minutes, and the second stage of the graft polymerization was finished.

Subsequently, the following third monomer mixture was dropped into the flask at 75° C. for 10 minutes, and polymerization was carried out.

The third monomer mixture: methyl methacrylate (10 parts) and t-butyl hydroperoxide (0.4 part).

The resultant mixture was held at 75° C. for 90 minutes, and the third stage of the graft polymerization was finished to obtain a latex of a graft copolymer (G-5).

Hereinafter, the same procedure as in Example 1 was carried out to obtain the graft copolymer (G-5).

Example 6

Graft Copolymer (G-6)

Production of Latex of Polymer (A1-6):
To a 70L autoclave equipped with a stirrer, a monomer addition port, and a thermometer, the following first monomer mixture was introduced, and temperature inside the autoclave was raised to 43° C. while the mixture was stirred.

The first monomer mixture: 1,3-butadiene (150 parts), styrene (50 parts), t-dodecyl mercaptan (1.0 part), diisopropylbenzene hydroperoxide (1.0 part), sodium dodecylbenzenesulfonate (2.0 parts), sodium hydroxide (0.02 part), and deionized water (585.98 parts).

Subsequently, the following first reducer mixture was added, and polymerization was started.

The first reducer mixture: ferrous sulfate (0.002 part), EDTA-2Na (0.006 part), Rongalite (0.3 part), and deionized water (9.692 parts).

The temperature inside the autoclave was further raised to 65° C. and held for 10 hours, to obtain a latex of a polymer (A1-6).

Production of Latex of Polymer Mixture (A-6):
To a 5L separable flask equipped with a stirrer, a reflux condenser, a nitrogen introduction pipe, a monomer addition port, and a thermometer, the following latex mixture was introduced at 20° C.

The latex mixture: the latex of the polymer (A1-6) (720 parts) (solid content: 180 parts), styrene (120 parts), t-dodecyl mercaptan (0.6 part), t-butyl hydroperoxide (0.4 part), and deionized water (247.8 parts).

The latex mixture was stirred for 1 hour while temperature inside the flask was held at 20° C., and then the temperature inside the flask was raised to 55° C., and the following second reducer mixture was added to the flask to start polymerization of styrene.

The second reducer mixture: Rongalite (0.3 part) and deionized water (9.7 parts).

The temperature inside the flask was raised to 75° C. and held for 90 minutes to obtain a latex of a polymer mixture (A-6).

Hereinafter, graft polymerization was carried out in the same manner as in Example 5 except that the latex of the polymer mixture (A-5) was changed to the polymer mixture (A-6) to obtain a graft copolymer (G-6).

Comparative Example 1

Graft Copolymer (G-7)

Production of Latex of Polymer (A-7):
To a 70L autoclave equipped with a stirrer, a monomer addition port, and a thermometer, the following monomer mixture was charged and temperature inside the autoclave was raised to 43° C. while the mixture was stirred.

The monomer mixture: 1,3-butadiene (180 parts), styrene (120 parts), t-dodecyl mercaptan (1.0 part), diisopropylbenzene hydroperoxide (1.0 part), sodium dodecylbenzenesulfonate (2.0 parts), sodium hydroxide (0.02 part), and deionized water (784.78 parts).

Subsequently, the following reducer mixture was added, and polymerization was started.

The reducer mixture: ferrous sulfate (0.002 part), EDTA-2Na (0.006 part), Rongalite (0.3 part), and deionized water (9.692 parts).

The temperature inside the autoclave was further raised to 65° C. and held for 10 hours, to obtain a latex of a polymer (A-7).

Hereinafter, graft polymerization was carried out in the same manner as in Example 1 except that the latex of the polymer mixture (A-1) was changed to the latex of the polymer (A-7) to obtain a graft copolymer (G-7).

Comparative Example 2

Graft Copolymer (G-8)

The same procedure as in Example 1 was carried out except that the latex mixture to be used for production of the latex of the polymer mixture (A-1) was changed to the following composition to obtain a graft copolymer (G-8).

The latex mixture: the latex of the polymer (A1-1) (840 parts) (solid content: 210 parts), styrene (90 parts), t-butyl hydroperoxide (0.4 part), and deionized water (158.4 parts).

Comparative Example 3

Graft Copolymer (G-9)

The same procedure as in Example 1 was carried out except that the latex mixture to be used for production of the latex of the polymer mixture (A-1) was changed to the following composition to obtain a graft copolymer (G-9).

The latex mixture: the latex of the polymer (A1-1) (480 parts) (solid content: 120 parts), styrene (180 parts), t-butyl hydroperoxide (0.4 part), and deionized water (428.4 parts).

Compositions, methods of production, refractive indexes (calculated values), and mass average particle diameters of the graft copolymers (G-1) to (G-9) are collectively shown in Table 1.

Methods (1) and (2) described in a column of a method of production of the polymer mixture (A) in Table 1 mean methods (1) and (2) described in the detailed statement of description as the method for producing the polymer mixture (A).

TABLE 1

| | | Polymer mixture (A) | | | | Vinyl monomer component (b) | | | | Refractive index (calculated value) | | | Mass average particle diameter (μm) |
|---|---|---|---|---|---|---|---|---|---|---|---|---|---|
| | | Content (%) | | Production method | Content/graft copolymer (%) | Compositional ratio (%) | | | Content/graft copolymer (%) | Polymer mixture | Grafted portion | The whole | |
| | | Butadiene | Styrene | | | Methyl methacrylate | Ethyl acrylate | Styrene | | | | | |
| Ex. 1 | G-1 | 58 | 42 | (1) | 75 | 25 | 5 | 70 | 25 | 1.547 | 1.560 | 1.555 | 0.1 |
| Ex. 2 | G-2 | 49 | 51 | (1) | 75 | 25 | 5 | 70 | 25 | 1.555 | 1.560 | 1.556 | 0.1 |
| Ex. 3 | G-3 | 49 | 51 | (1) | 75 | 45 | 5 | 50 | 25 | 1.555 | 1.540 | 1.551 | 0.1 |
| Ex. 4 | G-4 | 60 | 40 | (2) | 75 | 25 | 5 | 70 | 25 | 1.547 | 1.560 | 1.550 | 0.1 |
| Ex. 5 | G-5 | 60 | 40 | (1) | 75 | 45 | 5 | 50 | 25 | 1.547 | 1.540 | 1.545 | 0.1 |
| Ex. 6 | G-6 | 45 | 55 | (1) | 75 | 45 | 5 | 50 | 25 | 1.557 | 1.540 | 1.553 | 0.1 |
| Comp. Ex. 1 | G-7 | 60 | 40 | copolymerization | 75 | 25 | 5 | 70 | 25 | 1.547 | 1.560 | 1.550 | 0.1 |

TABLE 1-continued

| | | Polymer mixture (A) | | | Vinyl monomer component (b) | | | | Refractive index (calculated value) | | | Mass average particle diameter (μm) |
|---|---|---|---|---|---|---|---|---|---|---|---|---|
| | | Content (%) | | Production method | Content/graft copolymer (%) | Compositional ratio (%) | | | Content/graft copolymer (%) | Polymer mixture | Grafted portion | The whole |
| | | Butadiene | Styrene | | | Methyl methacrylate | Ethyl acrylate | Styrene | | | | |
| Comp. Ex. 2 | G-8 | 68 | 32 | (1) | 75 | 25 | 5 | 70 | 25 | 1.540 | 1.560 | 1.545 | 0.1 |
| Comp. Ex. 3 | G-9 | 39 | 61 | (1) | 75 | 25 | 5 | 70 | 25 | 1.560 | 1.560 | 1.560 | 0.1 |

Examples 7 to 17, Comparative Examples 4 to 7

An aromatic polycarbonate (Iupilon S-2000F: manufactured by Mitsubishi Engineering-Plastics Corporation) as the thermoplastic resin and each graft copolymer (G-1) to (G-9) as the impact resistance improver were used with compounding ratios shown in Table 2.

Each of thus obtained compounds was supplied to a twin-screw extruder having a diameter of 30 mm and melt-kneaded at a cylinder temperature of 280° C. to obtain pellets of a thermoplastic resin composition. The pellets were subjected to injection molding to obtain test pieces. The test pieces thus obtained were subjected to the following evaluations. The results of the evaluations are shown in Table 2.

(1) Izod Test (Impact Resistance Test)

Izod test was performed in accordance with ASTM D256. The test was carried out using a test piece having a thickness of ¼ inch with a notch. The measurement was carried out at a low temperature (−30° C.) and at a room temperature (25° C.). When all the test pieces of the thermoplastic resin composition were not broken down, the result was presented as NB.

(2) Transparency (Total Light Transmittance, Haze)

A flat plate test piece having a thickness of 3 mm was made, and total light transmittances and haze thereof were measured in accordance with JIS-K7105 using a haze meter HR-100 (manufactured by Murakami Color Research Laboratory).

ture of the polymer mixture (A) of the present invention is not provided. Consequently, an improvement effect of impact resistance at a low temperature is low, and a resultant balance between impact resistance and transparency is inferior to that in the impact resistance improver of the present invention.

In the impact resistance improver of Comparative Example 5, the content of styrene units in the polymer mixture (A) is low, and hence transparency of a shaped article thus obtained is low, though an improvement effect of impact resistance is sufficient.

In the impact resistance improver of Comparative Example 6, the content of butadiene units is low, and hence the improvement effect of impact resistance is insufficient, though transparency of a shaped article thus obtained is maintained.

As is apparent from the above, the impact resistance improver of the present invention can improve impact resistance at a low temperature of a thermoplastic resin, in particular, of an aromatic polycarbonate, and can maintain high transparency of a shaped article thus obtained.

In addition, in the case that at least one of dye and pigment is compounded in a polycarbonate composition, a shaped article having good coloring properties can be obtained because transparency of the shaped article is maintained.

INDUSTRIAL APPLICABILITY

The impact resistance improver of the present invention can improve impact resistance at a low temperature of a

TABLE 2

| | Thermoplastic | Impact resistance improver (part) | | | | | | | | | Izod test [J/m] | | Transparency | |
|---|---|---|---|---|---|---|---|---|---|---|---|---|---|---|
| | PC (part) | G-1 | G-2 | G-3 | G-4 | G-5 | G-6 | G-7 | G-8 | G-9 | At a low | At a room | Total light | Haze |
| Ex. 7 | 97 | 3 | | | | | | | | | 159 | NB | 60 | 87 |
| Ex. 8 | 97 | | 3 | | | | | | | | 149 | 240 | 68 | 85 |
| Ex. 9 | 97 | | | 3 | | | | | | | 152 | NB | 65 | 82 |
| Ex. 10 | 97 | | | | 3 | | | | | | 140 | 180 | 65 | 87 |
| Ex. 11 | 97.5 | | | | | 2.5 | | | | | 185 | NB | 58 | 73 |
| Ex. 12 | 97 | | | | | 3 | | | | | 190 | NB | 57 | 77 |
| Ex. 13 | 96.5 | | | | | 3.5 | | | | | 197 | NB | 54 | 81 |
| Ex. 14 | 95.5 | | | | | 4.5 | | | | | 205 | NB | 51 | 83 |
| Ex. 15 | 97 | | | | | | 3 | | | | 158 | NB | 65 | 65 |
| Ex. 16 | 95 | | | | | | 5 | | | | 146 | NB | 59 | 76 |
| Ex. 17 | 90 | | | | | | 10 | | | | 178 | NB | 51 | 87 |
| Comp. Ex. 4 | 97 | | | | | | | 3 | | | 120 | NB | 62 | 88 |
| Comp. Ex. 5 | 97 | | | | | | | | 3 | | 183 | NB | 48 | 88 |
| Comp. Ex. 6 | 97 | | | | | | | | | 3 | 121 | 195 | 80 | 82 |
| Comp. Ex. 7 | 100 | | | | | | | | | | 116 | 111 | 90 | 2 |

Abbreviation in the table
PC: Aromatic polycarbonate

From Examples 7 to 17, it is recognized that the impact resistance improver of the present invention improves impact resistance at a low temperature and maintains high transparency.

In the impact resistance improver of Comparative Example 4, butadiene and styrene are copolymerized and hence a structhermoplastic resin, in particular, of an aromatic polycarbonate, and can maintain high transparency of a shaped article thus obtained.

The thermoplastic resin composition in which the impact resistance improver of the present invention is compounded has excellent impact resistance at a low temperature and can maintain transparency, and hence can be used in a variety of uses such as materials for use in light media, where transparency is needed, or housings, where coloring properties are needed.

What is claimed is:

1. A thermoplastic resin composition comprising 90 to 99% by mass of a thermoplastic resin and 1 to 10% by mass of an impact resistance improver which is a graft copolymer to be obtained by polymerizing a vinyl monomer component (b) comprising an aromatic vinyl monomer (b1) and an alkyl (meth)acrylate monomer (b2) in the presence of a polymer mixture (A) comprising a polymer (A1) having butadiene units as a major component and a polymer (A2) having styrene units as a major component, wherein
　a content of the butadiene units in the polymer mixture (A) is 45 to 65% by mass,
　a content of the styrene units in the polymer mixture (A) is 35 to 55% by mass,
　the thermoplastic resin is an aromatic polycarbonate,
　the polymer mixture (A) is obtained by mixing a latex of the polymer (A1) having butadiene units as a major component and a monomer component having styrene as a major component, impregnating the polymer (A1) with the monomer component having styrene as a major component, and polymerizing the monomer component having styrene as a major component,
　the quantity of 1,3-butadiene in 100% by mass of the monomers to be used for polymerization of the polymer (A1) is 60% by mass or more, and
　the quantity of styrene in 100% by mass of the monomers to be used for polymerization of the polymer (A2) is 80% by mass or more.

2. A shaped article to be obtained by shaping the thermoplastic resin composition according to claim 1.

3. The thermoplastic resin composition of claim 1, wherein the aromatic vinyl monomer (b1) is styrene, α-methyl styrene or vinyl toluene.

4. The thermoplastic resin composition of claim 1, wherein the alkyl (meth)acrylate monomer (b2) is methyl (meth)acrylate, ethyl (meth)acrylate, n-butyl (meth)acrylate or 2-ethylhexyl (meth)acrylate.

5. The thermoplastic resin composition of claim 1, wherein the aromatic polycarbonate has a refractive index of 1.54 to 1.61.

6. The thermoplastic resin composition of claim 1, wherein the aromatic polycarbonate has a refractive index of 1.58 to 1.59.

7. The thermoplastic resin composition of claim 1, wherein the aromatic polycarbonate has a viscosity average molecular mass of 10,000 to 60,000.

8. The thermoplastic resin composition of claim 1, wherein the aromatic polycarbonate has a viscosity average molecular mass of 15,000 to 30,000.

9. The thermoplastic resin composition of claim 1, wherein the aromatic polycarbonate contains 2,2-bis(4-hydroxyphenyl)propane units.

10. The thermoplastic resin composition of claim 1, wherein the aromatic polycarbonate contains bis(4-hydroxyphenyl)methane, 2,2-bis(4-hydroxy-3,5-dimethylphenyl)propane, bis(4-hydroxy-3,5-dimethylphenyl)methane, or bis(4-hydroxyphenyl)sulfone units.

11. The thermoplastic resin composition of claim 1, wherein the content of the thermoplastic resin is 95 to 98% by mass of the composition.

12. The thermoplastic resin composition of claim 1, wherein the content of the thermoplastic resin is 95.5 to 97% by mass of the composition.

13. The thermoplastic resin composition of claim 1, which further comprises a flame retardant.

14. The thermoplastic resin composition of claim 1, wherein the quantity of 1,3-butadiene in 100% by mass of the monomers in the polymerization of the polymer (A1) is 80% by mass or more.

15. The thermoplastic resin composition of claim 1, wherein the quantity of styrene in 100% by mass of the monomers in the polymerization of the polymer (A2) is 90% by mass or more.

16. The thermoplastic resin composition of claim 1, wherein the content of the butadiene units in the polymer mixture (A) is 55 to 65% by mass.

17. A method of preparing the thermoplastic resin composition of claim 1, comprising mixing the thermoplastic resin and the impact resistance improver.

18. A method of preparing a shaped article, comprising shaping the thermoplastic resin composition of claim 1.

* * * * *